United States Patent Office 3,257,157
Patented June 21, 1966

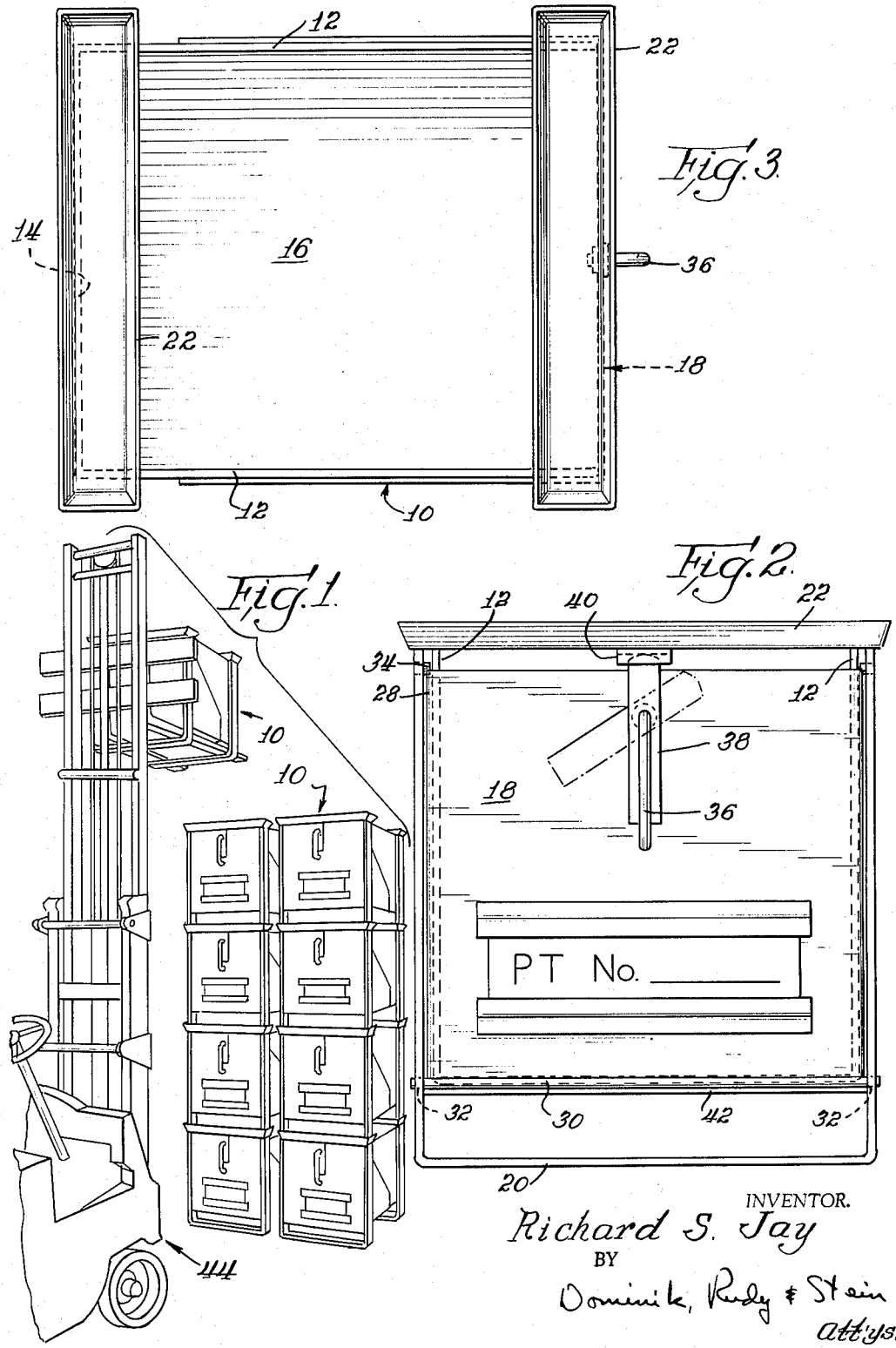

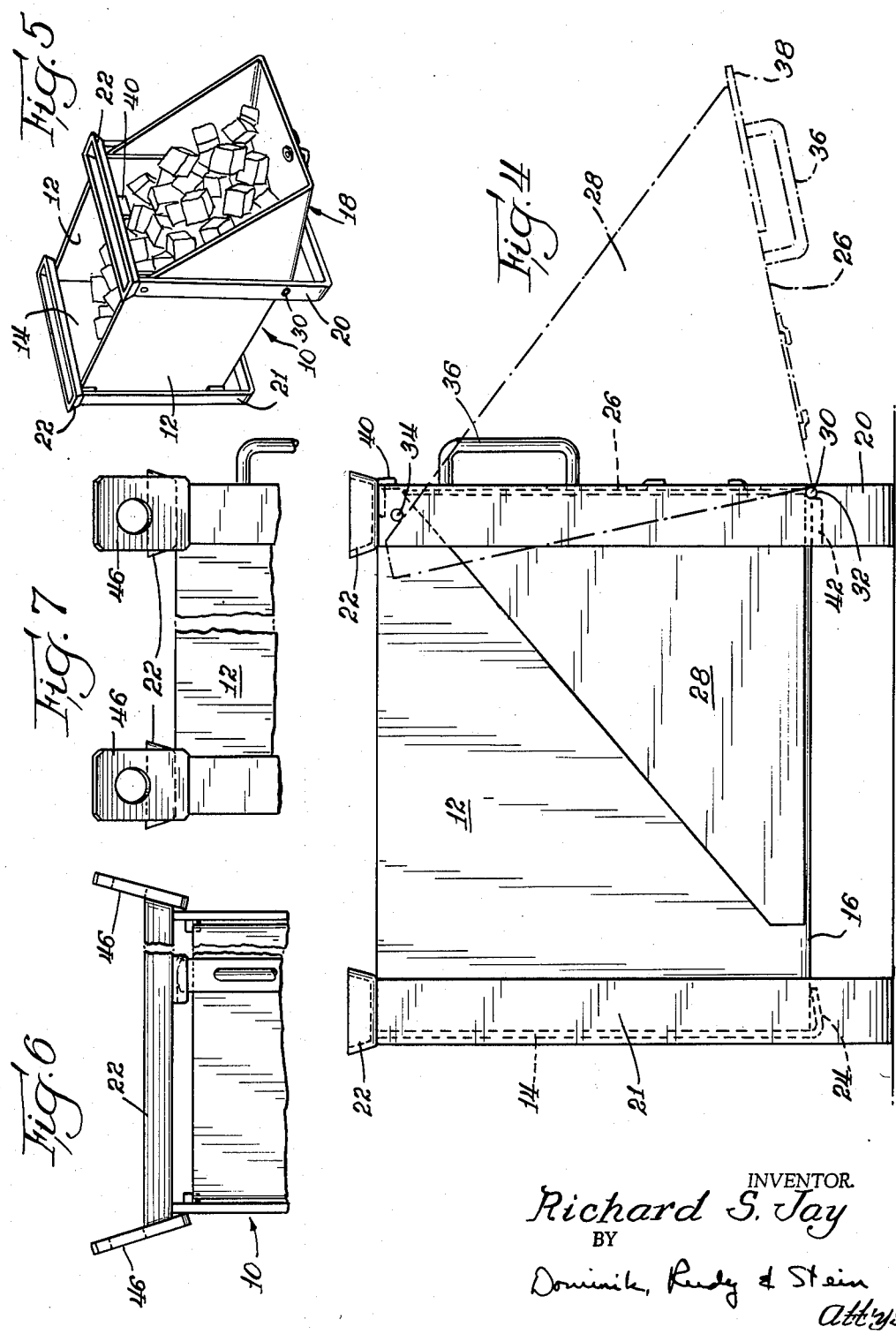

3,257,157
MATERIAL HANDLING AND STORAGE HOPPER
Richard S. Jay, Evanston, Ill., assignor to Jarke Corporation, Chicago, Ill., a corporation of Illinois
Filed Sept. 30, 1963, Ser. No. 312,557
4 Claims. (Cl. 312—328)

This invention relates to material, or parts, handling and storage hoppers.

In factory production operations, efficient material storage and handling operations can result in substantial savings in costs. The hopper assemblage of the invention incorporates features which make it ideally suited for use in many factory material storage and handling operations. More particularly, the hopper assemblage of the invention may be used for storage of a great variety of parts, and may be stacked in high, compact tiers, requiring minimum ground area. In addition, the subject hopper assemblage will provide four-way entry of lift truck forks, thereby allowing greater flexibility in storage arrangement and/or access corridors. A further feature resides in the provision of a pivoted front wall serving as a hopper mouth, which may be opened for convenient dispensing of parts; such a feature is especially useful when the hopper assemblage, or any number of them, are positioned at work stations. A simple manual operation is all that is required to open a sturdy gravity latch, which holds the hopper mouth in closed position. Another feature resides in the provision of self-aligning, no-slip mounting means which assures rapid and positive stacking of two or more hopper assemblies. Still another feature pertains to a simple modification which allows overhead crane handling, in addition to fork lift truck handling.

The main object of this invention is to provide an improvement in material handling and storage hoppers.

A more specific object is to provide material handling and storage hoppers which may be stacked in high, compact tiers requiring minimum floor area.

Still another object of this invention is to provide material handling and storage hoppers which afford four-way entry of the forks of a lift truck thus allowing greater flexibility in storage arrangement and/or access corridors.

A further object is to provide a material handling and storage hopper which allows easy removal of the contents, even when the hoppers are stacked, whereby the hoppers may be conveniently positioned at work stations.

A further object is the provision of self-aligning, no-slip mounting means which assures rapid and positive stacking of two or more hopper assemblies.

Another object is to provide a material handling and storage hopper which affords flexible usage, that is, one which may be handled by a fork lift truck, or an overhead crane.

Still another object is to provide a material handling and storage hopper which is of sturdy design, and which will assure long and reliable service under rugged usage.

These and further objects and features of the invention will become more apparent from the following description and accompanying drawings wherein:

FIG. 1 is a perspective-like view of a plurality of stacked hoppers made in accordance with the principles of the invention, and showing the manner in which a fork lift truck may be used for handling said hoppers;

FIG. 2 is a front view of one of the hoppers shown in FIG. 1;

FIG. 3 is a plan view of said hopper;

FIG. 4 is a side view of said hopper;

FIG. 5 is a perspective-like view of said hopper showing a pivoted front wall in lowered position;

FIG. 6 is a fragmentary front view of a hopper showing lugs attached thereto for overhead handling of the hopper with crane hooks; and FIG. 7 is a fragmentary side view of the same.

Referring now to the drawings, numeral 10 identifies an open top rectangular container in the form of a bin, or hopper assemblage illustrative of an embodiment of the invention, which hopper assemblage includes an open front container formed of side walls 12, a back wall 14, and a bottom 16, a movably arranged front wall assemblage 18 which serves as a hopper mouth, and a pair of U-shaped frame members 20 and 21, having parallel side legs and an interconnecting leg, which frame members serve as leg means as well as columnar means for support of recessed cross beams 22.

The side walls 12 and bottom 16 may be formed of a single piece of mtaerial, bent to desired shape, while the back wall 14 may have an integral flange 24 along the lower end which provides support for the bottom 16, as best seen in FIG. 4.

The front wall assemblage 18 is formed of a rectangular front portion 26, and a pair of triangular side pieces 28, the inside dimension between the side pieces being slightly greater than the outside dimension of the side walls 12, so that the side pieces 28 will have a sliding fit with the side walls. A shaft, or rod 30 is affixed along the lower edge of the front wall portion 26, which rod projects beyond the width of the wall portion 26 at each end thereof for support in bores 32 formed in the frame member 20. In such manner, the front wall assemblage 18 is pivotally supported for movement toward open or closed position. A pair of stop pins 34 are arranged in the frame member 20 which serve as an abutment for the side pieces 28 to limit extent of open position of the wall assemblage 18, as seen in FIG. 4. In closed position of the wall assemblage 18, the inner edge surface of the front portion 26 will abut the front vertical edge of side walls 12.

A vertically disposed handle 36 is affixed to the front portion 26, the upper leg thereof having a latch 38 pivotally mounted thereupon. The latch 38 is arranged so that an upper portion projects beyond the upper edge of the front portion 26 for sliding engagement with a keeper or strike plate 40 secured to the under side of a cross beam 22. The lower portion of the latch 38, which is of greater length than the upper portion thereof, will provide pendulum action to maintain the latch in vertical position so that the keeper plate is engaged whereby the front wall assemblage 18 will be held in closed position. In moving the front wall assemblage 18 to closed position, it is only necessary to swing the latch 38 so that the upper portion thereof will clear the keeper plate 40 until fully closed position is reached; upon release of the latch, it will swing to vertical position, to effect locking action.

The U-shaped frame means 20, 21, together with the attached cross beams 22, serve in effect as strap means for the bin, which is affixed to the strap by means, such as by welding. A cross brace 42 is advantageously arranged between the opposite legs of the frame member 20, for the support of the forward end of the bottom 16. It will be noted the side walls 12 are spaced from the frame means 20 to provide a vertical slot in which the triangular side pieces 28 may slide during opening and closing movement of the front wall assemblage 18.

The frame means 20, 21 are arranged to support the bin a given distance from the floor, to thus provide an opening whereby the forks of a lift truck 44 may be inserted for raising or lowering the hopper assemblage, as illustrated in FIG. 1. It is to be noted that this arrangement will allow four way entry of the forks of a lift truck, that is, the forks may be inserted under the hopper assemblage from any of the four sides thereof. Each of the cross beams 22 has a tapered side wall, elongated cup formation, the internal dimensions of which are slightly larger than the external dimensions of the ground engaging portion of each frame member 20, 21, so that the cross beams may engagingly receive the lower portions of the frame means when the hopper assemblages are in stacked condition. In such manner, each hopper assemblage is maintained in secure position when stacked, since the cup formation of the cross beams 22 prevents relative shifting, or sliding movement between the stacked hopper assemblies. The tapered walls of the elongated cup formations provide self-alignment of the stacked hopper assemblages.

When it is desired to utilize a crane with a hook arrangement for handling the hopper assemblies 10, a lug, or apertured plate 46 may be affixed, as by welding, to the end of each cross beam 22, as illustrated in FIGS. 6 and 7, for receipt of the crane hooks. Such a provision does not, of course, prevent use of a fork lift truck for handling such modified hopper assemblies, if so desired, nor in any way detract from the advantageous features associated with the hopper assemblage of the invention.

From the foregoing it will be seen that the hopper assemblage above described will satisfy all of the objectives of the invention set forth hereinbefore.

The foregoing description has been given in detail without thought of limitation since the inventive principles involved are capable of assuming other forms without departing from the spirit of the invention or the accompanying claims.

What is claimed is:

1. A material handling and storage hopper comprising in combination, an open top container including three vertically disposed walls and a bottom, a movable wall having a pair of side pieces arranged to slide against the outer surfaces of two of the vertically disposed walls, said movable wall being pivoted along a lower edge and being arranged for opened or closed position, a pair of U-shaped frame members adapted to support the container a given distance from the ground, a cross beam affixed to the upper end of each frame member and traversing the top of the container, each of said cross beams having an elongated cup shape to engagingly receive the lower portions of said U-shaped frame members of a similar hopper whereby stacking of the hoppers may be conveniently achieved, a vertically disposed U-shaped handle affixed to the movable wall, a latch pivotally supported on the upper leg of said U-shaped handle, and a keeper plate secured to a cross beam for engagement by the latch.

2. A material handling and storage hopper comprising in combination, a container including side walls and a movable wall having a pair of side pieces arranged to slide against the outer surfaces of two of said side walls, said movable wall being pivoted along a lower edge and being arranged for opened or closed position, a pair of U-shaped frame members adapted to support the container a given distance from the ground, a cross beam affixed to the upper end of each frame member and traversing the top of the container, each of said cross beams having an elongated cup shape to engagingly receive the lower portions of said U-shaped frame members of a similar hopper whereby stacking of the hoppers may be conveniently achieved, a vertically disposed U-shaped handle affixed to the movable wall, a latch pivotally supported on the upper leg of said U-shaped handle, and a keeper plate secured to a cross beam for engagement by the latch.

3. A material handling and storage hopper comprising in combination, an open top container including a pair of side walls and a bottom wall formed from a single piece of material, a back wall having an integral flange adapted to provide support for said bottom wall and a movable wall having a pair of side pieces arranged to slide against the outer surfaces of said pair of side walls, said movable wall being pivoted along a lower edge and being arranged for opened or closed position, a pair of U-shaped frame members adapted to support the container a given distance from the ground, a cross beam affixed to the upper end of each frame member and traversing the top of the container, each of said cross beams having an elongated cup shape to engagingly receive the lower portions of said U-shaped frame members of a similar hopper whereby stacking of the hoppers may be conveniently achieved, a vertically disposed U-shaped handle affixed to the movable wall, a latch pivotally supported on the upper leg of said U-shaped handle, and a keeper plate secured to a cross beam for engagement by the latch.

4. A material handling and storage hopper comprising in combination, a container including side walls and a movable wall having a pair of side pieces arranged to slide against the outer surfaces of two of said side walls, said movable wall being pivoted along a lower edge and being arranged for opened or closed position, a pair of U-shaped frame members adapted to support the container a given distance from the ground, a cross beam affixed to the upper end of each frame member and traversing the top of the container, each of said cross beams having an elongated cup shape to engagingly receive the lower portions of said U-shaped frame members of a similar hopper whereby stacking of the hoppers may be conveniently achieved, a handle affixed to the movable wall, a latch pivotally supported on said movable wall in a position so as to be operable with one hand simultaneously with grasping said handle and in a manner so as to provide a pendulum action to maintain said latch in a vertical position, and a keeper plate secured to a cross beam for engagement by the latch.

References Cited by the Examiner

UNITED STATES PATENTS

| 1,017,962 | 2/1912 | Fliedner | 220—97 |
| 2,046,095 | 6/1936 | Shaw. | |
| 2,732,967 | 1/1956 | Metcalf | 220—97 |

FOREIGN PATENTS 896,476  11/1953  Germany.

THERON E. CONDON, *Primary Examiner.*

GEORGE E. LOWRANCE, *Examiner.*